US012688989B2

(12) United States Patent
Huang et al.

(10) Patent No.: US 12,688,989 B2
(45) Date of Patent: Jul. 21, 2026

(54) RELAY

(71) Applicant: BYD COMPANY LIMITED, Shenzhen (CN)

(72) Inventors: Jiakun Huang, Shenzhen (CN); Tao Lu, Shenzhen (CN); Xiaoyong Lei, Shenzhen (CN); Xiangyu Dai, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 306 days.

(21) Appl. No.: 18/472,326

(22) Filed: Sep. 22, 2023

(65) Prior Publication Data

US 2024/0029985 A1 Jan. 25, 2024

Related U.S. Application Data

(63) Continuation of application No. PCT/CN2022/080406, filed on Mar. 11, 2022.

(30) Foreign Application Priority Data

Jun. 30, 2021 (CN) ........................ 202121489467.9

(51) Int. Cl.
*H01H 1/54* (2006.01)
*H01H 50/18* (2006.01)
(Continued)

(52) U.S. Cl.
CPC .............. *H01H 50/54* (2013.01); *H01H 1/54* (2013.01); *H01H 50/18* (2013.01); *H01H 50/38* (2013.01)

(58) Field of Classification Search
CPC ........................................................ H01H 1/54
(Continued)

(56) References Cited

U.S. PATENT DOCUMENTS 7,859,373 B2 * 12/2010 Yamamoto ........... H01H 50/546
335/131
9,059,523 B2 * 6/2015 Enomoto ................ H01H 3/46
(Continued)

FOREIGN PATENT DOCUMENTS

CN 209675208 U 11/2019
CN 110797234 A 2/2020
(Continued)

OTHER PUBLICATIONS

The World Intellectual Property Organization (WIPO) International Search Report for PCT/CN2022/080406 May 23, 2022 6 Pages.

*Primary Examiner* — Alexander Talpalatski
(74) *Attorney, Agent, or Firm* — Wenye Tan

(57) ABSTRACT

A relay includes a static contact assembly, a movable contact plate, a static magnet yoke, a movable magnet yoke and a pushing rod assembly. The static magnet yoke and the movable magnet yoke are arranged oppositely. The movable contact plate is mounted at a position on the movable magnet yoke opposite to the static contact assembly. An isolation space is provided between the movable contact plate and the movable magnet yoke. The static contact assembly and the static magnet yoke are arranged on a side of the movable contact plate away from the pushing rod assembly. The pushing rod assembly is configured to push the movable magnet yoke to move toward the static magnet yoke to cause the movable contact plate to be in contact with the static contact assembly.

13 Claims, 5 Drawing Sheets

(51) Int. Cl.
*H01H 50/38* (2006.01)
*H01H 50/54* (2006.01)

(58) Field of Classification Search
USPC .......................................................... 335/147
See application file for complete search history.

(56) References Cited

U.S. PATENT DOCUMENTS

| | | | | |
|---|---|---|---|---|
| 9,269,507 | B2 * | 2/2016 | Enomoto | H01H 1/54 |
| 10,090,127 | B2 * | 10/2018 | Ito | H01H 50/56 |
| 11,670,472 | B2 * | 6/2023 | Zhong | H01H 50/18 335/2 |
| 11,735,386 | B2 * | 8/2023 | Zhou | H01H 50/045 335/195 |
| 12,119,190 | B2 * | 10/2024 | Yoo | H01H 50/36 |
| 12,243,700 | B2 * | 3/2025 | Zhong | H01H 9/443 |
| 2020/0286702 | A1 * | 9/2020 | Kodama | H01H 50/60 |
| 2021/0151271 | A1 * | 5/2021 | Kodama | H01H 50/54 |

FOREIGN PATENT DOCUMENTS

| | | | |
|---|---|---|---|
| CN | 111091987 | A | 5/2020 |
| CN | 210516637 | U | 5/2020 |
| CN | 211980527 | U | 11/2020 |
| CN | 215451293 | U | 1/2022 |
| JP | 2012022984 | A | 2/2012 |
| JP | 2012104364 | A | 5/2012 |
| JP | 2014130771 | A | 7/2014 |
| JP | 2015079672 | A | 4/2015 |
| KR | 20200025805 | A | 3/2020 |

* cited by examiner

RELAY

CROSS-REFERENCE TO RELATED APPLICATIONS

The present application is a continuation application of PCT application No. PCT/CN2022/080406 filed on Mar. 11, 2022, which claims priority to Chinese Patent Application No. 202121489467.9, filed on Jun. 30, 2021 and entitled "RELAY", content of all of which is incorporated herein by reference in its entirety.

FIELD

The present disclosure relates to the technical field of relays, and more specifically, to a relay.

BACKGROUND

Relays are widely used in high-voltage equipment, and a short-circuit resistance capability of the relay is an important indicator for evaluating quality. In the related art, when the high-voltage equipment connected to the relay is short-circuited, a short-circuit current will flow through movable contact and static contact of the relay, so that large repulsive force will be generated between the movable contact and the static contact, and the movable contact and the static contact are separated, which eventually leads to a severe arcing phenomenon and makes the relay fail. Therefore, the relay in the related art has a problem of weak short-circuit resistance.

SUMMARY

The present disclosure provides a relay aiming at a technical problem of a weak short-circuit resistance capability of the relay in the related art.

In view of the above technical problem, an embodiment of the present disclosure provides a relay, which includes: a static contact assembly, a movable contact plate, a static magnet yoke, a movable magnet yoke and a pushing rod assembly. The static magnet yoke and the movable magnet yoke are arranged oppositely. The movable contact plate is mounted at a position on the movable magnet yoke opposite to the static contact assembly. An isolation space is provided between the movable contact plate and the movable magnet yoke.

The static contact assembly and the static magnet yoke are arranged on a side of the movable contact plate away from the pushing rod assembly. The pushing rod assembly is configured to push the movable magnet yoke to move toward the static magnet yoke to cause the movable contact plate to be in contact with the static contact assembly.

BRIEF DESCRIPTION OF THE DRAWINGS

The present disclosure is further described below with reference to the accompanying drawings.

DETAILED DESCRIPTION

In order to make the technical problems solved by the present disclosure, technical solutions and beneficial effects clearer, the present disclosure will be further described in detail below with reference to the accompanying drawings. It should be understood that specific embodiments described here are only used to explain the present disclosure, not to limit the present disclosure.

It should be understood that terms such as "above", "below", "left", "right", "front", "back", and "middle" are based on orientation or position relationships shown in the accompanying drawings, and are used only for ease and brevity of illustration and description, rather than indicating or implying that the mentioned apparatus or component need to have a particular orientation or need to be constructed and operated in a particular orientation. Therefore, such terms should not be construed as limiting of the present disclosure.

Figure 1:
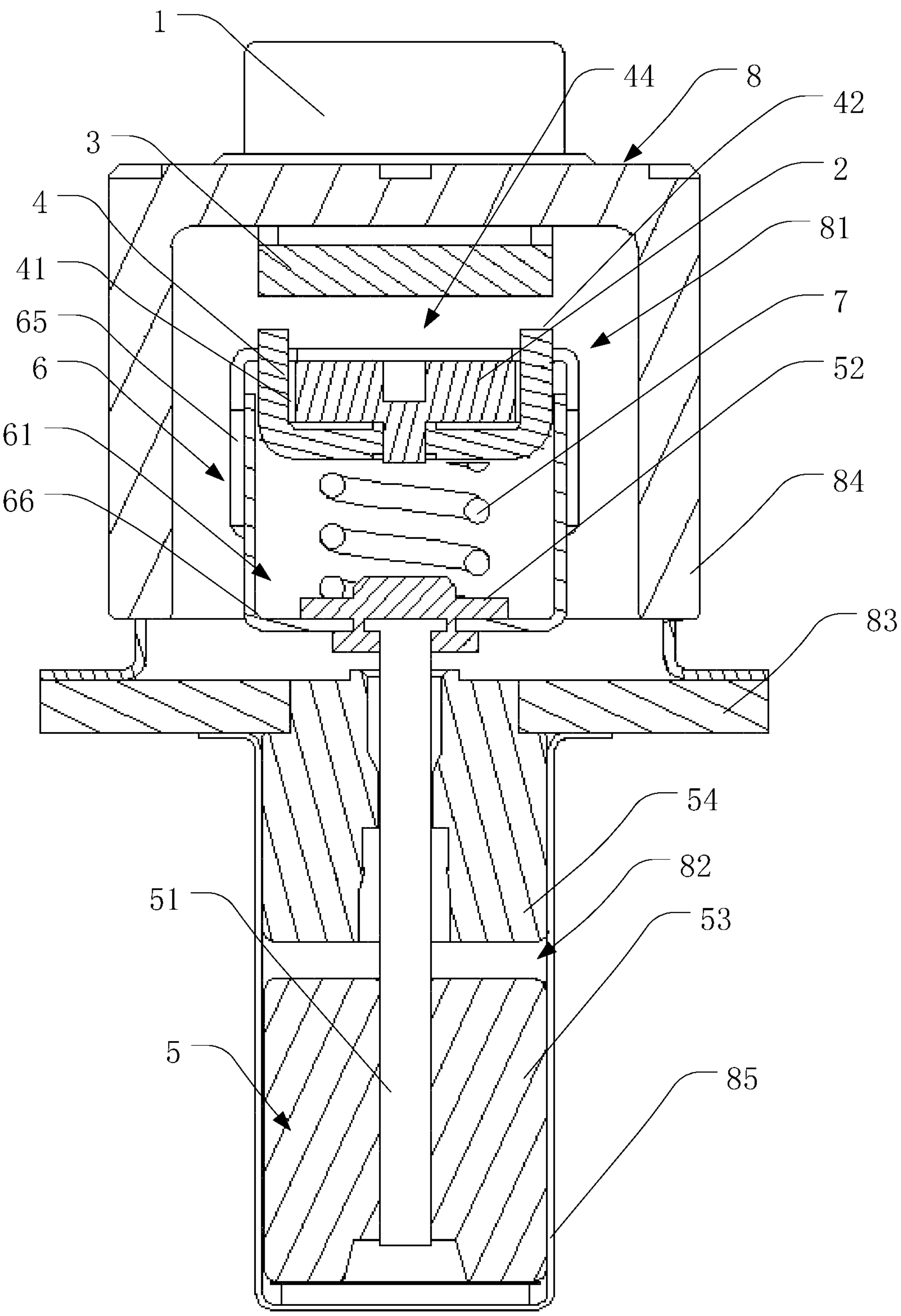
FIG. 1 is a cross-sectional view of a structure of a relay according to an embodiment of the present disclosure.

As shown in FIG. 1, a relay provided by an embodiment of the present disclosure includes a static contact assembly 1, a movable contact plate 2, a static magnet yoke 3, a movable magnet yoke 4, and a pushing rod assembly 5. The static magnet yoke 3 and the movable magnet yoke 4 are arranged oppositely. The movable contact plate 2 is mounted at a position on the movable magnet yoke 4 opposite to the static contact assembly 1. An isolation space is provided between the movable contact plate 2 and the movable magnet yoke 4. It can be understood that in the embodiment shown in FIG. 1, the static magnet yoke 3 is located above the movable magnet yoke 4 and is arranged opposite to the movable magnet yoke 4, and the static contact assembly 1 is located above the movable contact plate 2 and is arranged opposite to the movable contact plate 2. The movable contact plate 2 and the movable magnet yoke 4 can be separated by air or by an insulating member to prevent an induced current on the movable magnet yoke 4 from being offset by a short-circuit current of the movable contact plate 2.

The static contact assembly 1 and the static magnet yoke 3 are arranged on a side of the movable contact plate 2 away from the pushing rod assembly 5. The pushing rod assembly 5 is configured to push the movable magnet yoke 4 to move toward the static magnet yoke 3 to cause the movable contact plate 2 to be in contact with the static contact assembly 1. In an optional embodiment, a first distance between the static magnet yoke 3 and the movable magnet yoke 4 is greater than a second distance between the static contact assembly 1 and the movable contact plate 2. It can be understood that the first distance is a distance between a lower end surface of the static magnet yoke 3 and an upper end surface of the movable magnet yoke 4, and the second distance is a distance between a lower end surface of the static contact assembly 1 and an upper end surface of the movable contact plate 2. The first distance is greater than the second distance, so that after the pushing rod assembly 5 drives the movable magnet yoke 4 to move toward the static magnet yoke 3, and when the movable contact plate 2 is in contact with the static contact assembly 1, the static magnet yoke 3 may be in contact with the movable magnet yoke 4, or may not be in contact with the movable magnet yoke 4. In this case, it can be ensured that the movable contact plate 2 is in contact with the static contact assembly 1 while or before the movable magnet yoke 4 is in contact with the static magnet yoke 3, thereby avoiding a risk that the movable contact plate 2 is not in contact with the static contact assembly 1 when the movable magnet yoke 4 is in contact with the static magnet yoke 3 (that is, if the movable magnet yoke 4 is in contact with the static magnet yoke 3 and the movable contact plate 2 is not in contact with the static contact assembly 1, the relay cannot realize conduction of two sections of high-voltage lines of the static contact assembly 1, and the relay will not have its basic functions as a switch), which improves practicability of the relay.

Specifically, in an embodiment, the static contact assembly 1 includes a first static contact and a second static contact, and the first static contact and the second static contact are respectively connected to positive and negative poles of high-voltage equipment, that is, the two sections of high-voltage lines. Operation principles of the relay are as follows. When the pushing rod assembly 5 starts to move up under a control of a low-voltage electricity, the movable contact plate 2 and the movable magnet yoke 4 move up together under the push of the pushing rod assembly 5 until the movable contact plate 2 is in contact with the first static contact and the second static contact at the same time, so that the two sections of high voltage lines are conducted through a conduction path of the first static contact, the movable contact plate 2 and the second static contact. Similarly, when the pushing rod assembly 5 starts to move down under the control of the low-voltage electricity, the movable contact plate 2 and the movable magnet yoke 4 move down together under the drive of the pushing rod assembly 5 until the movable contact plate 2 is separated from the first static contact and the second static contact, so that the conduction path of the two sections of high-voltage lines is disconnected, thereby realizing disconnection of the conduction between two sections of high-voltage lines through the relay.

In the present disclosure, the static contact assembly 1 and the static magnet yoke 3 are arranged on the side of the movable contact plate 2 away from the pushing rod assembly 5. When the pushing rod assembly 5 pushes the movable magnet yoke 4 to move toward the static magnet yoke 3 until the movable contact plate 2 is in contact with the static contact assembly 1, a distance between the movable magnet yoke 4 and the static magnet yoke 3 is relatively close or the movable magnet yoke 4 and the static magnet yoke 3 are in contact with each other, and a high-voltage line connected to the static contact assembly 1 (in this case, the high-voltage line refers to a high-voltage line of the high-voltage equipment connected to the relay) realizes the conduction through the static contact assembly 1 and the movable contact plate 2 that are in contact with each other in the relay (that is, the relay is conducted). In this case, if a short circuit occurs on the high-voltage line, a short-circuit current on the movable contact plate 2 and the static contact assembly 1 will increase sharply, and the sharply increased short-circuit current generates repulsive force (Holm force) between the movable contact plate 2 and the static contact assembly 1. But at the same time, the increased short-circuit current on the movable contact plate 2 will cause a changing magnetic field to be generated on the movable magnet yoke 4. The changing magnetic field will generate attraction force on the static magnet yoke 3. The attraction force will prevent separation between the movable contact plate 2 and the static contact assembly 1 due to existence of the repulsive force. Therefore, an arcing phenomenon caused by the separation between the movable contact plate 2 and the static contact assembly 1 is avoided, thereby avoiding failure of the relay. The short-circuit resistance capability of the relay is improved.

Figure 5:
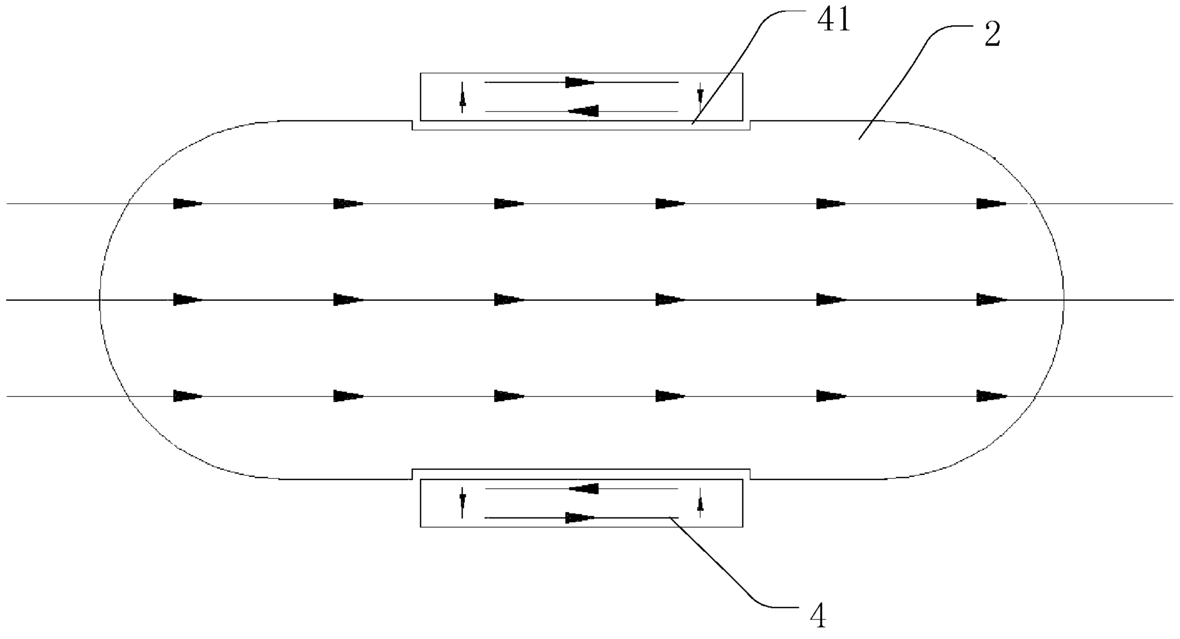
FIG. 5 is a schematic diagram of an induced current on a movable magnet yoke and a short-circuit current on a movable contact plate according to an embodiment of the present disclosure.
Figure 6:
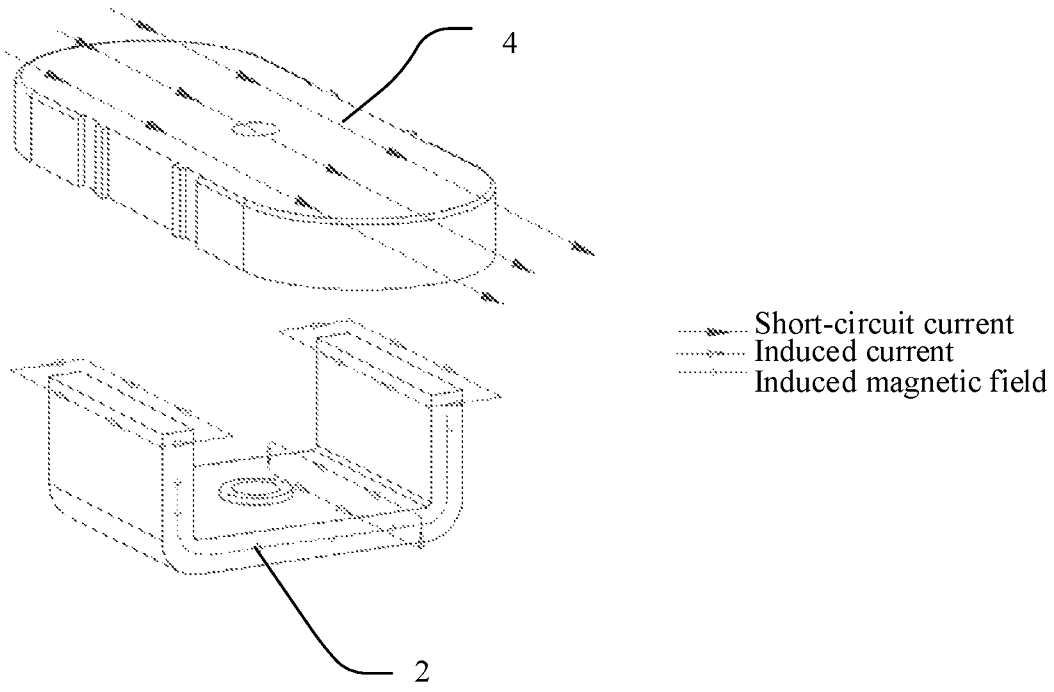
FIG. 6 is a schematic diagram of a three-dimensional structure of an induced current and an induced magnetic field on a movable magnet yoke and a short-circuit current on a movable contact plate according to an embodiment of the present disclosure.

Further, as shown in FIG. 5 and FIG. 6, according to the law of electromagnetic induction, it can be learned that the changing magnetic field generated on the movable magnet yoke 4 generates an induced current on the movable magnet yoke 4. According to the Lenz's law, it can be learned that a direction of the induced current is opposite to a direction of the short-circuit current on the movable contact plate 2. In the present disclosure, since the isolation space 41 is provided between the movable contact plate 2 and the movable magnet yoke 4, the isolation space 41 will minimize the induced current on the movable magnet yoke 4 to be offset by the short-circuit current on the movable contact plate 2 (if the movable contact plate 2 is in direct contact with the movable magnet yoke 4 without the isolation space 41, the short-circuit current on the movable contact plate 2 will offset a part of the induced current on the movable magnet yoke 4, thereby weakening magnetic field strength on the movable magnet yoke 4, and reducing the attraction force between the static magnet yoke 3 and the movable magnet yoke 4). In this case, influence of the short-circuit current on the movable contact plate 2 on the induced current on the movable magnet yoke 4 will be weakened or even eliminated, thereby maintaining the magnetic field strength on the movable magnet yoke 4 and further improving the short-circuit resistance capability of the relay. In addition, the relay has a simple structure and is easy to install.

Figure 2:
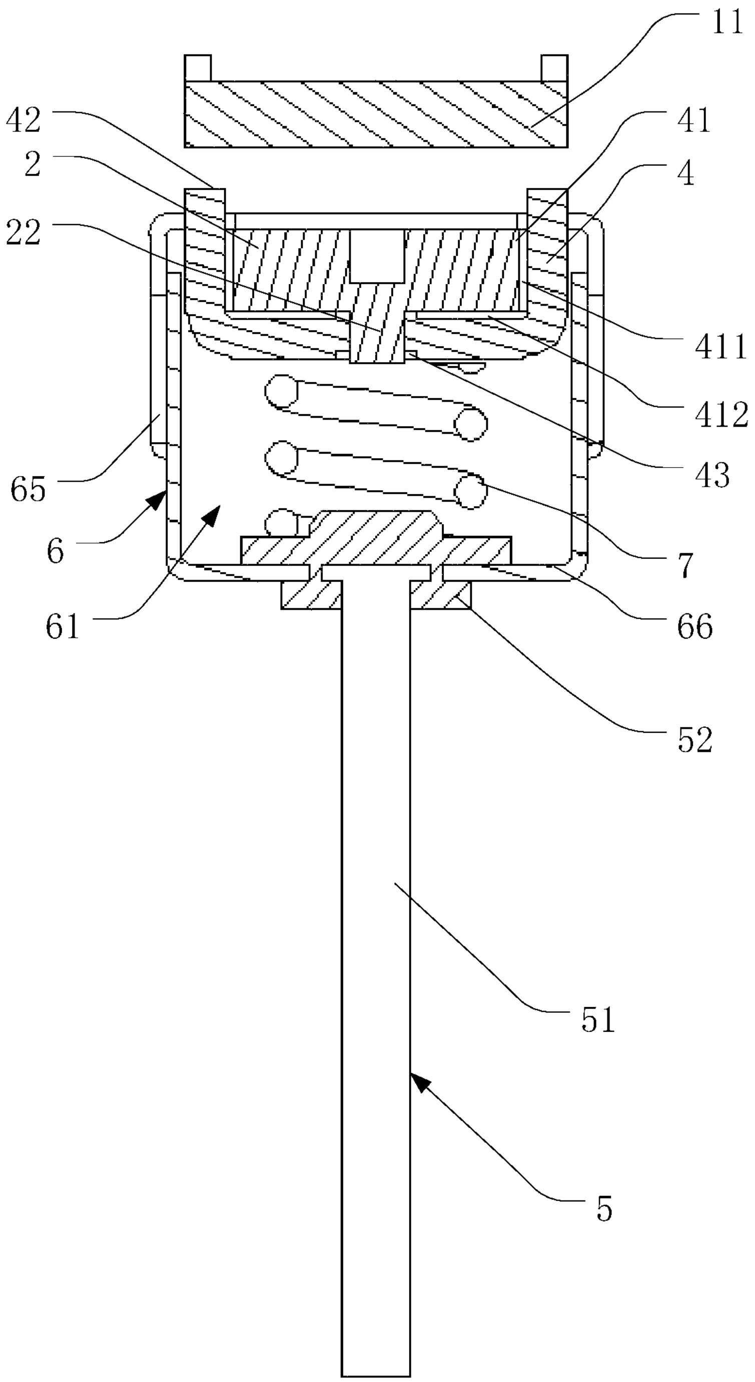
FIG. 2 is a partial cross-sectional view of a relay according to an embodiment of the present disclosure.
Figure 4:
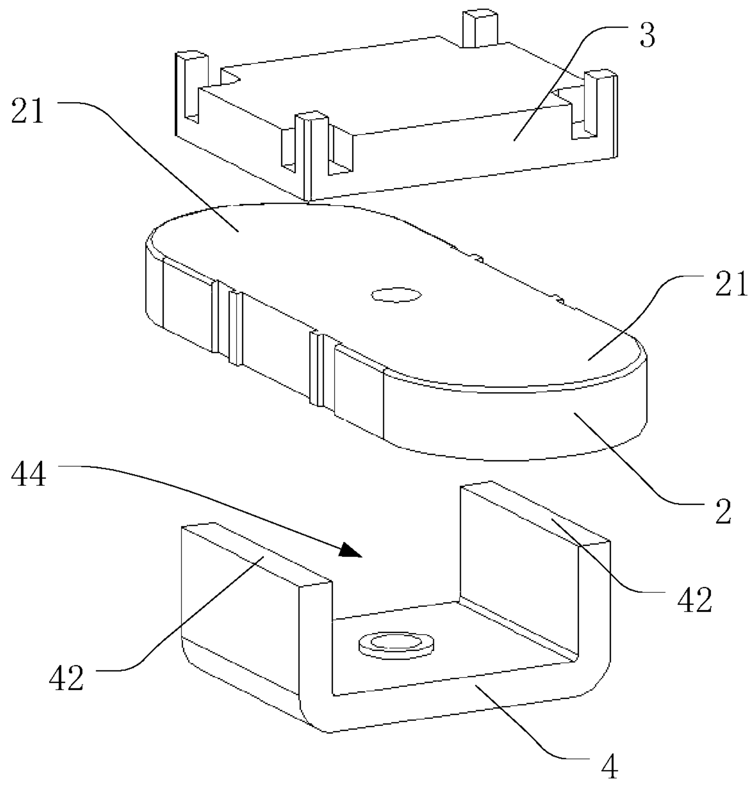
FIG. 4 is a schematic diagram of a partial exploded structure of a relay according to an embodiment of the present disclosure.

In an embodiment, as shown in FIG. 2 and FIG. 4, a U-shaped groove 44 is provided on the movable magnet yoke 4. The movable contact plate 2 is mounted in the U-shaped groove 44. The isolation space 41 includes a side isolation space 411 and/or a bottom isolation space 412. The side isolation space 411 is provided between an outer side surface of the movable contact plate 2 and an inner side wall of the U-shaped groove 44. The bottom isolation space 412 is provided between a bottom end of the movable contact plate 2 and a groove bottom surface of the U-shaped groove 44. It can be understood that an opening of the U-shaped groove 44 faces the static contact assembly 1 (that is, the opening of the U-shaped groove 44 faces upward). The side isolation space 411 includes left side isolation space and right side isolation space. The left side isolation space is formed between a left side inner wall of the U-shaped groove 44 and a left side surface of the movable contact plate 2. The right isolation space is formed between a right side inner wall of the U-shaped groove 44 and a right side surface of the movable contact plate 2. The bottom isolation space 412 is formed between the groove bottom surface of the U-shaped groove 44 and a bottom end surface of the movable contact plate 2. In this case, the side isolation space 411 and the bottom isolation space 412 are isolated by air. In this embodiment, the isolation space 41 may be formed of the side isolation space 411, may be formed of the bottom isolation space 412, or may be formed of the bottom isolation space 412 and the side isolation space 411. A structure of the movable magnet yoke 4 is simple, and convenience of installing the relay is improved.

In a specific embodiment, the outer side surface of the movable contact plate 2 is provided with a groove, and the groove is recessed toward the middle of the movable contact plate 2, so that the side isolation space 411 can be formed between the outer side surface of the movable contact plate 2 and the inner side wall of the U-shaped groove 44. The bottom of the movable contact plate 2 is provided with a convex column 22, the movable contact plate 2 is mounted in the U-shaped groove 44 through the convex column. Due to existence of the convex column, the bottom end of the movable contact plate 2 is not contact with the groove bottom surface of the U-shaped groove 44, so that the bottom isolation space 412 is formed between the bottom end of the movable contact plate 2 and the groove bottom surface of the U-shaped groove 44.

In an embodiment, as shown in FIG. 2 and FIG. 4, the movable magnet yoke 4 is further provided with a first mounting hole 43. The movable contact plate 2 is provided with the convex column 22 adapted to the first mounting hole 43. The movable contact plate 2 is mounted on the movable magnet yoke 4 through the convex column 22 inserted into the first mounting hole 43. In an optional embodiment, the entire movable contact plate 2 is made of metal materials. In this case, except that contact portions of the convex column 22 and the first mounting hole 43 between the movable contact plate 2 and the movable magnet yoke 4 are not isolated, remaining portions between the movable contact plate 2 and the movable magnet yoke 4 are the isolation space 41. In this embodiment, the convex column 22 can play a role of installing the movable contact plate 2 on the movable magnet yoke 4. The movable contact plate 2 has a simple structure and low manufacturing cost. In another optional embodiment, the convex column 22 can be made of insulating materials. In this case, there is complete isolation between the movable contact plate 2 and the movable magnet yoke 4. That is, the contact portions of the movable contact plate 2 and the movable magnet yoke 4 are isolated (that is, the isolation between the convex column 22 and the first mounting hole 43), and the contact portions of the movable contact plate 2 and the movable magnet yoke 4 are also isolated (that is, isolated through the isolation space 41). In this embodiment, the complete isolation between the movable contact plate 2 and the movable magnet yoke 4, to the greatest extent, prevents the induced current on the movable magnet yoke 4 from being offset by the short-circuit current of the movable contact plate 2, which further improves the short-circuit resistance capability of the relay.

In an embodiment, the relay further includes an insulating sleeve (not shown) sleeved on the convex column 22, and the convex column 22 is inserted into the first mounting hole 43 through the insulating sleeve. It can be understood that the insulating sleeve is located between the convex column 22 and an inner wall of the first mounting hole 43, so that the contact parts between the movable contact plate 2 and the movable magnet yoke 4 are also isolated. Further, technical effect of the complete isolation between the movable contact plate 2 and the movable magnet yoke 4 is achieved, which to the greatest extent, prevents the induced current on the movable magnet yoke 4 from being offset by the short-circuit current on the movable contact plate 2, and further improves the short-circuit resistance capability of the relay.

In an embodiment, the relay further includes an insulating member (not shown) mounted in the isolation space 41, and the insulating member is connected between the movable contact plate 2 and the movable magnet yoke 4. It can be understood that the insulating member is made of insulating materials, including but not limited to insulating rubber, insulating ceramics and the like.

In an embodiment, as shown in FIG. 1, FIG. 2 and FIG. 4, the relay further includes a mounting bracket 6 provided with an internal space 61, and the pushing rod assembly 5 is connected to the movable magnet yoke 4 through the mounting bracket 6. The movable magnet yoke 4 and the movable contact plate 2 are mounted in the internal space 61. Specifically, a receiving groove is formed between the movable magnet yoke 4 and an upper inner side wall of the internal space 61. The movable contact plate 2 is located in the receiving groove.

The mounting bracket 6 is further provided with a first opening 62 and a second opening 63 that are in communication with the internal space 61. The movable magnet yoke 4 includes a magnetic attraction portion 42 that extends out of the first opening 62 and that is arranged opposite to the static magnet yoke 3. The movable contact plate 2 includes a movable contact portion 21 that extends out of the second opening 63 and that is arranged opposite to the static contact assembly 1. It can be understood that, in the embodiment shown in FIG. 1, two first openings 62 are provided on the top of the mounting bracket 6. The second openings 63 are provided on the left and right sides of the mounting bracket 6. The movable magnet yoke 4 is a U-shaped structural member with two magnetic attraction portions 42. The two magnetic attraction portions 42 are located on an upper surface of the U-shaped movable magnet yoke 4, and the static magnet yoke 3 is located above the magnetic attraction portion 42. The movable contact plate 2 is long plate-shaped, and opposite ends of the long plate-shaped movable contact plate 2 in a length direction are respectively provided with the movable contact portion 21. The two movable contact portions 21 are located on an upper surface of the movable contact plate 2. The movable contact portions 21 of the movable contact plate 2 extend out of the second opening 63. The static contact assembly 1 is located above the movable contact portion 21. In this embodiment, the pushing rod assembly 5 drives the movable magnet yoke 4 up until the movable contact portion 21 is in contact with the static contact assembly 1. The magnetic attraction portion 42 is close to the static magnet yoke 3 or is in contact with the static magnet yoke 3, and attraction force is generated between the magnetic attraction portion 42 and the static magnet yoke 3. In this embodiment, the design of the mounting bracket 6 improves compactness of the relay.

In addition, the pushing rod assembly 5 is connected to the mounting bracket 6. The movable magnet yoke 4 is mounted on the mounting bracket 6. The pushing rod assembly 5 is connected to the movable magnet yoke 4 through the mounting bracket 6, which simplifies a mounting process of the relay.

In an embodiment, as shown in FIG. 1 and FIG. 2, the relay further includes an elastic member 7 mounted in the internal space 61. An end of the elastic member 7 is connected to an end of the movable magnet yoke 4 away from the static magnet yoke 3, and an other end of the elastic member 7 is connected to the pushing rod assembly 5. It can be understood that the elastic member 7 includes but is not limited to a spring and the like. Specifically, when the pushing rod assembly 5 drives the movable contact plate 2 to be in contact with the static contact assembly 1, the static contact assembly 1 compresses the elastic member 7 downward, so that compressive elastic force of the elastic member 7 keeps the movable contact plate 2 always in contact with the static contact assembly 1, which improves stability of the relay. In addition, the elastic member 7 can further buffer contact force between the movable contact plate 2 and the static contact assembly 1, thereby prolonging service life of the relay.

In an embodiment, as shown in FIG. 1 and FIG. 2, the mounting bracket 6 is provided with a second mounting hole 64 in communication with the internal space 61. The pushing rod assembly 5 includes a pushing rod 51 and an insulating block 52 mounted in the second mounting hole 64. The pushing rod 51 is connected to the elastic member 7 through the insulating block 52. It can be understood that the second mounting hole 64 is located at the bottom of the mounting bracket 6, the insulating block 52 is mounted in the second mounting hole 64, and an upper end and a lower end of the insulating block 52 are respectively connected to the elastic member 7 and the pushing rod 51. The insulating block 52 enables the pushing rod 51 to be in insulating connection with the mounting bracket 6 and the elastic member 7, avoiding that current on the movable contact plate 2 is transmitted to the pushing rod 51 through the elastic member 7 and/or the mounting bracket 6, and avoiding damage to a low-voltage circuit of the relay.

Further, the insulating block 52 is mounted on the bottom of the mounting bracket 6, and the movable contact plate 2 and the movable magnet yoke 4 are mounted on the top of the mounting bracket 6, so that the distance between the movable contact plate 2 and the insulating block 52 is increased, a rise in temperature when the movable contact plate 2 is short-circuited is reduced, and the insulating block 52 is damaged due to excessive temperature, which further improves the short-circuit resistance capability of the relay.

Figure 3:
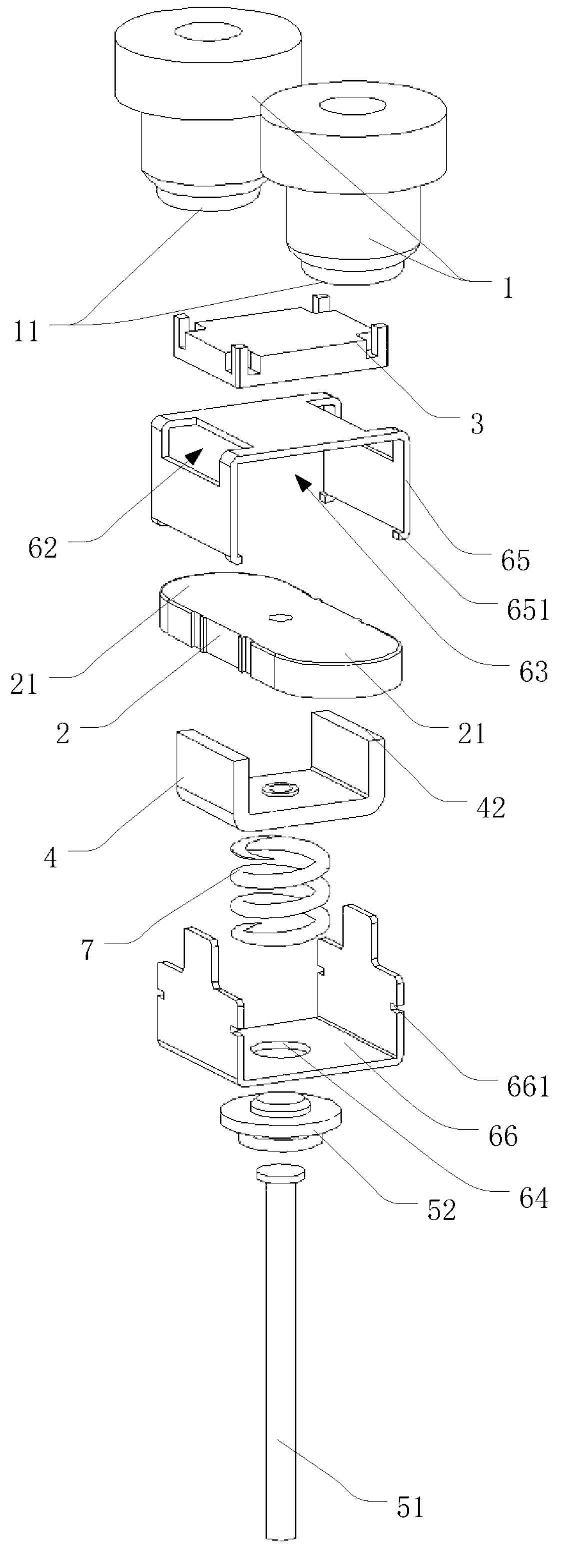
FIG. 3 is a schematic diagram of an exploded structure of a relay according to an embodiment of the present disclosure.

In an embodiment, as shown in FIG. 3, the mounting bracket 6 includes an upper bracket 65 and a lower bracket 66. The upper bracket 65 is provided with a first snap-fit piece 651. The lower bracket 66 is provided with a second snap-fit piece 661. The upper bracket 65 is connected to the lower bracket 66 through the second snap-fit piece 661 and the first snap-fit piece 651. The first opening 62 is provided on the upper bracket 65, and the second opening 63 is provided on the upper bracket 65 or/and the lower bracket 66. It can be understood that the second opening 63 can be provided on the upper bracket 65, can be provided on the lower bracket 66, or can be provided both on the upper bracket 65 and the lower bracket 66. The second mounting hole 64 is provided on the lower bracket 66, and both the upper bracket 65 and the lower bracket 66 are U-shaped. In an optional embodiment, the first snap-fit piece 651 is a snap-fit arm, the second snap-fit piece 661 is a snap-fit groove. The upper bracket 65 is connected to the lower bracket 66 through the snap-fit arm snapped into the snap-fit groove. In another optional embodiment, the first snap-fit piece 651 is a snap-fit groove, the second snap-fit piece 661 is a snap-fit arm. The upper bracket 65 is connected to the lower bracket 66 through the snap-fit arm snapped into the snap-fit groove (or the upper bracket 65 and the lower bracket 66 of the rod can be fixed by other connection manners). In this embodiment, the upper bracket 65 is connected to the lower bracket 66 through the second snap-fit piece 661 and the first snap-fit piece 651, which improves convenience of mounting and dismounting the mounting bracket 6 and reduces the manufacturing cost of the relay.

In an embodiment, as shown in FIG. 1, the relay further includes a housing 8 provided with an accommodating space 81. The static contact assembly 1 is mounted on the housing 8. The static contact assembly 1 includes a static contact portion 11 that extends into the accommodating space 81 and that is arranged opposite to the movable contact portion 21. The static magnet yoke 3 is mounted on an inner side wall of the accommodating space 81 opposite to the magnetic attraction portion 42. Both the movable contact plate 2 and the movable magnet yoke 4 are located in the accommodating space 81. It can be understood that an end of the static contact assembly 1 extends out of the accommodating space 81, and an other end of the static contact assembly 1 (that is, the static contact portion 11) is located in the accommodating space 81. The static magnet yoke 3 is mounted on an inner side wall above the accommodating space 81. The mounting bracket 6 is also located in the accommodating space 81. In this embodiment, the housing 8 is arranged, so that the movable contact plate 2, the movable magnet yoke 4 and the static magnet yoke 3 are all located in the accommodating space 81, interference of external environment on the movable contact plate 2, the movable magnet yoke 4 and the static magnet yoke 3 is avoided, and the service life of the relay is prolonged.

In an embodiment, as shown in FIG. 1, the pushing rod assembly 5 includes a pushing rod 51, a movable iron core 53, and a static iron core 54 provided with a through hole. The static iron core 54 is fixedly mounted (fixedly mounted by screw connection, bonding, welding, interference connection and the like) on the housing 8. The housing 8 is further provided with a sliding space 82, and the sliding space 82 is in communication with the accommodating space 81 through the through hole. The sliding space 82 is located below the accommodating space 81.

The movable iron core 53 is slidably mounted in the sliding space 82. An end of the pushing rod 51 is connected to the movable magnet yoke 4, and an other end of the pushing rod 51 passes through the through hole and is fixedly connected to the movable iron core 53. It can be understood that when both the movable iron core 53 and the static iron core 54 are energized (both the movable iron core 53 and the static iron core 54 are in communication with the low-voltage electricity), magnetic force is generated between the movable iron core 53 and the static iron core 54 (the magnetic force can be repulsive force or attraction force, the pushing rod 51 can be pushed to move up based on the attraction force or the pushing rod 51 can be driven to move down based on the repulsive force). The static iron core 54 is fixed on the housing 8, the magnetic force drives the movable iron core 53 to move, and the movable iron core 53 that is moving drives the pushing rod 51 to move up or down, thereby realizing technical effect that the pushing rod assembly 5 drives the movable magnet yoke 4 to move toward or away from the static magnet yoke 3. In this embodiment, the pushing rod assembly 5 has simple structure, convenient control and high safety.

In an embodiment, as shown in FIG. 1, the housing 8 includes a partition plate 83, an upper housing 84 and a lower housing 85. The upper housing 84 is connected to the lower housing 85 through the partition plate 83. The accommodating space 81 is surrounded by the upper housing 84 and the partition plate 83. The sliding space 82 is surrounded by the lower housing 85 and the partition plate 83, and the static iron core 54 is fixedly mounted on the partition plate 83. It can be understood that an upper end of the housing 8 is provided with the accommodating space 81, and a lower end of the housing 8 is provided with the sliding space 82. The movable iron core 53 and the movable iron core 53 are mounted in the sliding space 82. The static contact assembly 1, the movable contact plate 2, the static magnet yoke 3, the movable magnet yoke 4, and the elastic member 7 are all located in the accommodating space 81. The partition plate 83 and the static iron core 54 separate the accommodating space 81 from the sliding space 82, thereby avoiding mutual interference between members in the accommodating space 81 and members in the sliding space 82, which enables a working process of the relay to be more stable and prolongs the service life of the relay.

The foregoing descriptions are merely embodiments of the relay of the present disclosure, and are not intended to limit the present disclosure. Any modification, equivalent replacement, or improvement made within the spirit and principle of the present disclosure shall fall within the protection scope of the present disclosure.

What is claimed is:

1. A relay, comprising:

a static contact assembly, a movable contact plate, a static magnet yoke, a movable magnet yoke, and a pushing rod assembly, the static magnet yoke and the movable magnet yoke being arranged oppositely; the movable contact plate being mounted at a position on the movable magnet yoke opposite to the static contact assembly; and an isolation space being provided between the movable contact plate and the movable magnet yoke; and the static contact assembly and the static magnet yoke being arranged on a side of the movable contact plate away from the pushing rod assembly; and the pushing rod assembly being configured to push the movable magnet yoke to move toward the static magnet yoke to cause the movable contact plate to be in contact with the static contact assembly, wherein the movable magnet yoke is a U-shape and comprising two magnetic attraction portions at two ends of the U-shape, and the relay further comprises:

a mounting bracket provided with an internal space, the pushing rod assembly being connected to the mounting bracket; and the movable magnet yoke and the movable contact plate being mounted in the internal space; and the mounting bracket covers the movable magnet yoke and the movable contact plate in a direction facing away from the static contact assembly; and the mounting bracket being further provided with two first openings on a top surface facing the static contact assembly, and two second openings on two sides; the two magnetic attraction portions of movable magnet yoke extending out of the two first openings respectively and being arranged opposite to the static magnet yoke; and the movable contact plate comprising two movable contact portions extending out of the two second openings respectively and being arranged opposite to the static contact assembly.

2. The relay according to claim 1, wherein:

a U-shaped groove is provided on the movable magnet yoke, the movable contact plate is mounted in the U-shaped groove, and the isolation space comprises a side isolation space or a bottom isolation space;

the side isolation space is provided between an outer side surface of the movable contact plate and an inner side wall of the U-shaped groove; and the bottom isolation space is provided between a bottom end of the movable contact plate and a groove bottom surface of the U-shaped groove.

3. The relay according to claim 1, wherein the movable magnet yoke is further provided with a first mounting hole, the movable contact plate is provided with a convex column adapted to the first mounting hole, and the movable contact plate is mounted on the movable magnet yoke through the convex column inserted into the first mounting hole.

4. The relay according to claim 2, wherein the movable magnet yoke is further provided with a first mounting hole, the movable contact plate is provided with a convex column adapted to the first mounting hole, and the movable contact plate is mounted on the movable magnet yoke through the convex column inserted into the first mounting hole.

5. The relay according to claim 3, the relay further comprising:

an insulating sleeve being sleeved on the convex column, and the convex column being inserted into the first mounting hole through the insulating sleeve.

6. The relay according to claim 4, the relay further comprising:

an insulating sleeve being sleeved on the convex column, and the convex column being inserted into the first mounting hole through the insulating sleeve.

7. The relay according to claim 1, the relay further comprising:

an insulating member being mounted in the isolation space, and the insulating member being connected between the movable contact plate and the movable magnet yoke.

8. The relay according to claim 1, the relay further comprising:

an elastic member being mounted in the internal space, an end of the elastic member being connected to an end of the movable magnet yoke away from the static magnet yoke, and an other end of the elastic member being connected to the pushing rod assembly.

9. The relay according to claim 8, wherein the mounting bracket is provided with a second mounting hole in communication with the internal space, the pushing rod assembly comprises a pushing rod and an insulating block mounted in the second mounting hole, and the pushing rod is connected to the elastic member through the insulating block.

10. The relay according to claim 1, wherein:

the mounting bracket comprises an upper bracket and a lower bracket; and the upper bracket is provided with a first snap-fit piece, the lower bracket is provided with a second snap-fit piece, the upper bracket is connected to the lower bracket through the second snap-fit piece and the first snap-fit piece, the first openings are provided on the upper bracket, and the second openings are provided on the upper bracket or/and the lower bracket.

11. The relay according to claim 8, the relay further comprising:

a housing being provided with an accommodating space, the static contact assembly being mounted on the housing, and the static contact assembly comprising a static contact portion extending into the accommodating space and being arranged opposite to the movable contact portion; the static magnet yoke being mounted on an inner side wall of the accommodating space opposite to the magnetic attraction portion; and both the movable contact plate and the movable magnet yoke being arranged in the accommodating space.

12. The relay according to claim 11, wherein:

the pushing rod assembly comprises the pushing rod, a movable iron core and a static iron core provided with a through hole; and the static iron core is fixedly mounted on the housing, a sliding space is further provided on the housing, and the sliding space is in communication with the accommodating space through the through hole; and the movable iron core is slidably mounted in the sliding space, an end of the pushing rod is connected to the movable magnet yoke, and an other end of the pushing rod passes through the through hole and is fixedly connected to the movable iron core.

13. The relay according to claim 12, wherein the housing comprises a partition plate, an upper housing and a lower housing; the upper housing is connected to the lower housing through the partition plate; the accommodating space is surrounded by the upper housing and the partition plate; and the sliding space is surrounded by the lower housing and the partition plate, and the static iron core is fixedly mounted on the partition plate.

* * * * *